United States Patent
Gosselin et al.

(10) Patent No.: US 7,281,447 B2
(45) Date of Patent: Oct. 16, 2007

(54) ARTICULATED MECHANISM COMPRISING A CABLE REDUCTION GEAR FOR USE IN A ROBOT ARM

(75) Inventors: Florian Gosselin, Fontenay-aux-Roses (FR); Alain Riwan, L'Hay les Roses (FR); Dominique Ponsort, Bievres (FR)

(73) Assignee: Commissariat a l'Energie Atomique, Paris (FR)

( * ) Notice: Subject to any disclaimer, the term of this patent is extended or adjusted under 35 U.S.C. 154(b) by 711 days.

(21) Appl. No.: 10/494,902

(22) PCT Filed: Nov. 15, 2002

(86) PCT No.: PCT/FR02/03914

§ 371 (c)(1),
(2), (4) Date: May 7, 2004

(87) PCT Pub. No.: WO03/043790

PCT Pub. Date: May 30, 2003

(65) Prior Publication Data

US 2004/0250644 A1    Dec. 16, 2004

(30) Foreign Application Priority Data

Nov. 19, 2001   (FR)   ................... 01 14923

(51) Int. Cl.
   *B25J 9/10*   (2006.01)

(52) U.S. Cl. .................... 74/490.04; 74/89.22; 901/21

(58) Field of Classification Search ................. 74/89.2, 74/89.22, 490.04; 901/21
   See application file for complete search history.

(56) References Cited

U.S. PATENT DOCUMENTS 4,717,309 A * 1/1988 Neuhaus ...................... 414/735
5,207,114 A    5/1993 Salisbury, Jr. et al.

FOREIGN PATENT DOCUMENTS

FR   2434685    3/1980
JP   60-227050  * 11/1985

* cited by examiner

*Primary Examiner*—William C. Joyce
(74) *Attorney, Agent, or Firm*—Pearne & Gordon LLP

(57) ABSTRACT

A link with a transmission cable (14) between a driving pulley (15) and a driven pulley (22) causing a mobile unit (5) to rotate, has two strands (23, 24) connecting the driven pulley (22) with idle pulleys (17, 18) which are substantially aligned with an axis (Y) of rotation of an part (2) intermediate to the unit (5) and to the base (1) on which the motor (12) is secured. Thus, the motor (12) is positioned on optionally fixed parts and rotation of the support (2) has only very little effect on the tension of the cable (14), so that it may always work properly. The invention is especially applied to articulated robot arms.

8 Claims, 4 Drawing Sheets

ARTICULATED MECHANISM COMPRISING A CABLE REDUCTION GEAR FOR USE IN A ROBOT ARM

FIELD OF THE INVENTION

The subject of this invention is an articulated mechanism notably comprising a cable reducer which may belong to a robot arm.

BACKGROUND OF THE INVENTION

Generally, robots refer to controllably deformable structures for accomplishing certain tasks, as well as to master arms actuated by an operator for transmitting instructions to a slave arm reproducing the movements of the master arm or to a virtual environment via mechanical transmissions or computer interfaces.

Several design constraints weigh heavily on robots and notably on master arms. First of all, the operator of a master arm must experience sensations analogous to those which he would have experienced by directly controlling the slave arm, especially when the latter is working: the stresses received by the slave arm should therefore be reproduced with sufficient accuracy in the master arm. The linkages between the different portions of the robot, essentially the joints, should be provided with little play and fitted out with accurate low inertia transmissions, having little friction but capable of being easily blocked. Finally, it is desirable that the robots be as lightweight as possible which involves not only reducing their own weight but distributing it so that it is only moderately exerted on the control means of the robot used for moving it or, on the contrary, for maintaining it in a stable state by recovering static stress.

Above all, the means used for thereby controlling the joints or the other linkages of the robot, comprise motors which are among the heaviest components of the robot. It is current practice to position them as much as possible on the bases or low parts of the robot in order to reduce or suppress the moments required for lifting or moving them. It is then mandatory to provide a suitable transmission between the motor and the unit of the robot which it drives and which also provides reduction of the angular velocity of the motor. This is easy if the unit is directly connected to the base; but if it is connected to the base via another unit, mobile on the base, and therefore providing another degree of freedom, it is much more difficult to design a suitable transmission because of the much more complex positions which the unit may take up relatively to the base.

The tensioned cables between the shaft of the motor and a fixing portion belonging to the driven unit should be mentioned among the transmissions which may be proposed. Such transmissions are adopted on remote manipulators with master and slave arms, where the cables however suffer from the drawback of being long, which reduces the stiffness of the transmission and of passing through complex trajectories which cause couplings between the movements of different parts of the robot.

The transmission cables positioned between two robot portions which are not directly connected with each other should normally be tensioned on pulleys fixed on intermediate units. Then there occur problems in that the distances between their fixing points on the motor, the intermediate units and the unit which they drive, generally vary, thereby-producing a change in the cable's tension through elasticity, with the drawback that the robot's stiffness is changed. The harm is more marked when the robot is a master arm which is displaced by hand and the motor is a force feedback motor, because the operator can only be uncomfortable by feeling that the mechanical strength opposed by the arm varies with the displacement.

An improved cable reducer drive is provided as an essential component of the invention. In its most general embodiment, it relates to an articulated mechanism which may belong to a robot arm, comprising a base, a support rotating on the base around a first axis and a unit rotating on the support around a second axis, which is not parallel to the first axis, as well as a unit actuator for having it rotate, the actuator comprising: a motor secured to the base; and characterized in that the actuator further comprises a tensioned cable between a shaft of the motor, at least a pair of idle pulleys rotating on the support and a pulley connected to the, unit, with the idle pulleys being substantially tangent to the first axis; the cable forming a pair of strands substantially in extension and collinear with the first axis; the idle pulleys and the pulley of the unit being positioned so that said strands of the pair extend between the pulley of the unit and the idle pulleys, respectively.

By having the cable form a pair of strands substantially in extension and collinear with the first axis, it is guaranteed that the extension and the tension of the cable are only very slightly changed when the intermediate support rotates around the first axis. Advanced designs of the mechanism further enable this undesirable extension to be reduced.

According to certain advantageous features of the invention, the shaft of the motor is perpendicular to the axes of rotation of two of the idle pulleys between which and the shaft of the motor, the cable forms two rectilinear strands; and a linear transmission exists between the shaft of motor and the cable.

An articulated mechanism which may belong to a robot arm, comprising a base, a support rotating on the base around a first axis, is provided in a more complex embodiment of the invention, characterized in that it comprises two pulleys for controlling an arm through a linkage mechanism and two actuators of the control pulleys, the actuators each comprising: a motor secured on the base; a tensioned cable between a shaft of the motor, a pair of idle pulleys rotating on the support and one of the control pulleys; the idle pulleys being substantially tangent to the first axis; the idle pulleys and the control pulleys being positioned so that the cables form pairs of strands substantially in extension and collinear with the first axis which each extend between one of the control pulleys and one of the idle pulleys; advantageously, the link mechanism comprises a unit which is stiffly connected to one of the control pulleys and an articulated connecting rod at the other of the control pulleys, the arm being articulated at the connecting rod and at the unit; the control pulleys being parallel.

BRIEF DESCRIPTION OF THE DRAWINGS

Three embodiments of the invention may be discovered in FIGS. 1, 2 and 3

DETAILED DESCRIPTION OF EXAMPLE EMBODIMENTS

Figure 1:
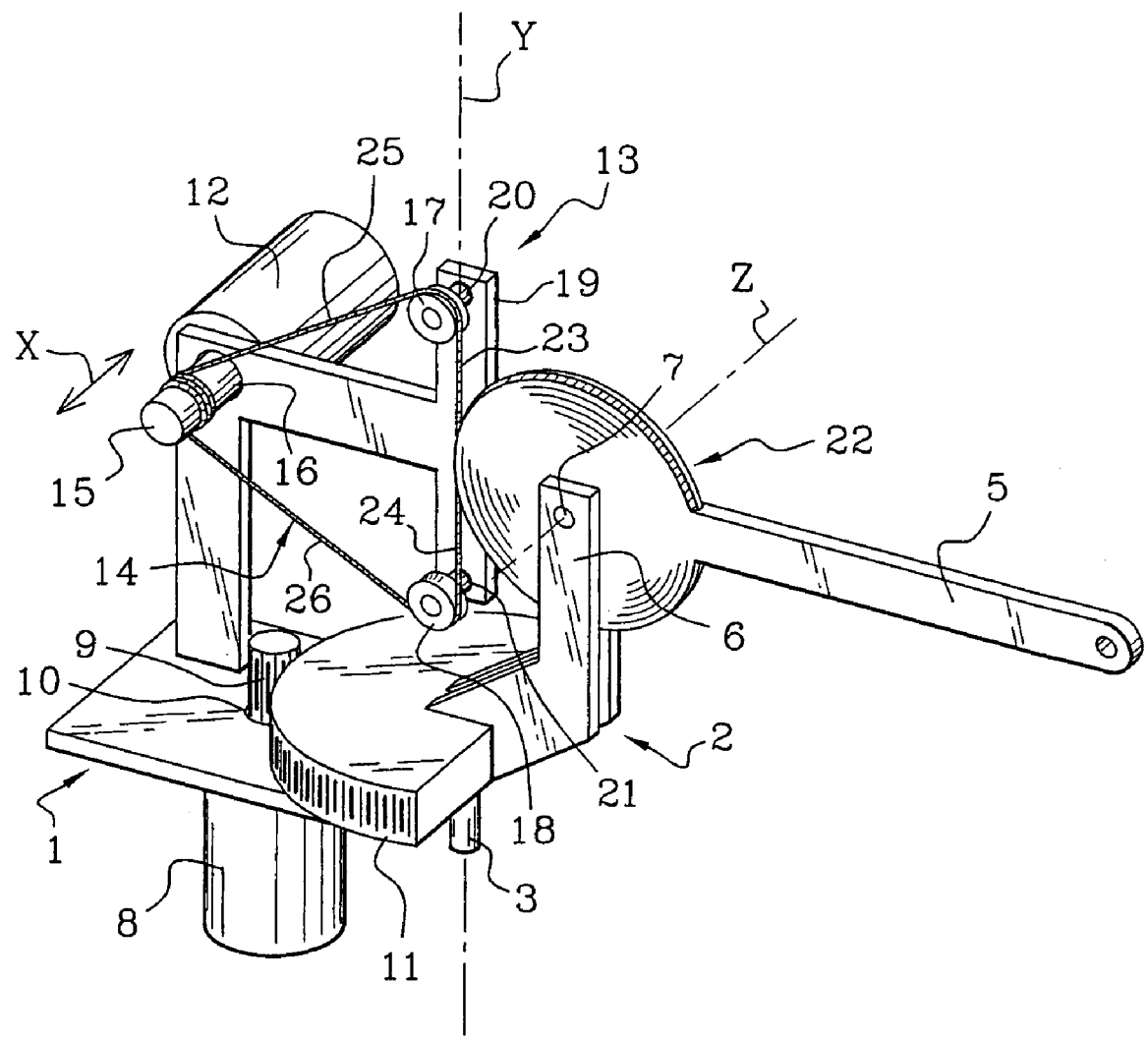

Three preferred embodiments which will be described successively and which are always more advanced, comprise certain common components which are disclosed in FIG. 1, including a base 1 which may be fixed or not, a support 2 mounted on the base 1 by rotating around a pivot 3 orientated along a first axis Y, and a unit 5 mounted on an arm 6 of support 2 through a pivot 7 rotating around a second axis Z. Here, axes Y and Z remain perpendicular in spite of possible movements of support 2 and unit 5; in other embodiments, they are simply not parallel. A first motor 8 drives support 2 into rotation via an elementary transmission consisting of a pinion 9 on the output shaft 10 of the motor 8 and an engaging toothed crown 11 cut on the perimeter of the support 2.

A second motor 12 drives the unit 5; like the first motor 8, it is secured on the base 1 and therefore can only drive unit 5 through a more complicated transmission; whereas the previous transmission might comprise a belt, a cable, etc., instead of a gear, it is recommended that above all, the composite transmission 13 between the second motor 12 and the unit 5 should comprise a tensioned cable 14 between a driving pulley 15 positioned on the output shaft 16 of the motor 12, a pair of idle pulleys 17 and 18 mounted on an arm 19 of base 1 through respective pivots 20 and 21, and a driven pulley 22 depending on unit 5 and stiffly fixed to it. Cable 14 is wound around the driven pulley 22 and covers a sufficient portion of a turn so as to obtain the desired clearance and around the driving pulley 15 covering several turns so that sufficient friction retains the cable 14 from sliding. Pivots 20 and 21 of the idle pulleys 17 and 18 are perpendicular to the first axis Y and extend at a little distance from it so that the tensioned cable 14 between the driven pulley 22 and each of the idle pulleys 17 and 18 forms a pair of strands 23 and 24 substantially in extension and coinciding with the first axis Y.

Rotation of support 2 around the first axis Y only very slightly changes the position of the strands 23 and 24 and therefore has hardly any influence on the tension of cable 14, which is the sought-after result. It will be noted that cable 14 will generally be wound with several turns around the driving pulley 15 so that it may drive the cable with sufficient friction, and that the corresponding strands of cable 14 respectively leading to the idle pulleys 17 and 18, and noted as 25 and 26, will therefore not be coplanar. Advantageously, pulleys 17 and 18 will be placed in planes respectively formed by strands 23 and 25 or 14 and 24 in the middle of the motor's travel.

However, the axes of pivots 20 and 21 are then not parallel, which may be disadvantageous.

Figure 2:
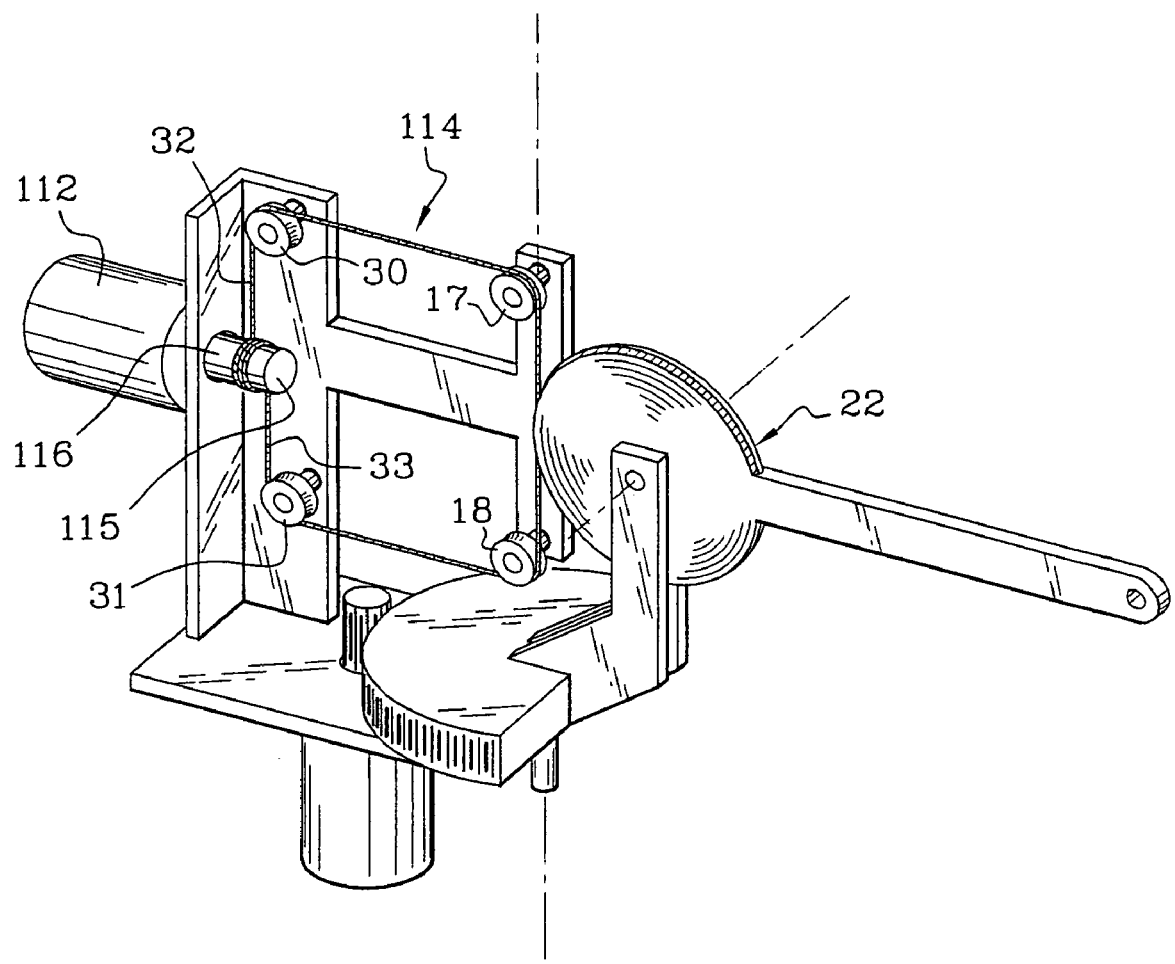

The embodiment of FIG. 2 differs from the previous one by the position of the second motor as well as by the shape of the cable which does not provide the drawback as indicated above; the components corresponding to those of the first embodiment but for which the description should be amended or completed will bear a reference number increased by 100.

Now the cable 114 is tensioned between two further idle pulleys 30 and 31 positioned between the shaft 116 of motor 112 and the previous idle pulleys 17 and 18, respectively. It forms a rectangle between the driving pulley 115 and the driven pulley 22.

This layout is meaningful if the motor 112 is orientated so that its shaft 116 is perpendicular to the second axis Z, when the latter is placed in the configuration of FIG. 2, as well as to the first axis Y and so that its pulley 115 is substantially tangent to the plane passing through the additional idle pulleys 30 and 31: strands 32 and 33 of the cable 114 leading from the additional idle pulleys 30 and 31 to the driven pulley 115 are then substantially coplanar, as well as the remainder of cable 114, by the way, which is tensioned while remaining straight in the grooves of the idle pulleys 17, 18, 31 and 32.

Referring back, please, to FIG. 1, it will be seen that rotation of the driving shaft 16 brings about an unwinding of the turns on one side of the pulley 115 and a winding of additional turns on the other side, i.e. a displacement of the stacking of the turns in the X direction or along the driving shaft 16. This is likely to vary the tension of the cable 114 and thereby prevent us from completely achieving the goal which we had set. This residual extension of the cable 114 still exists in the embodiment of FIG. 2, but as it is executed without substantially moving the cable 114 from the plane in which it extends, better stability of the mechanism's operation is achieved all the same.

Figure 3:
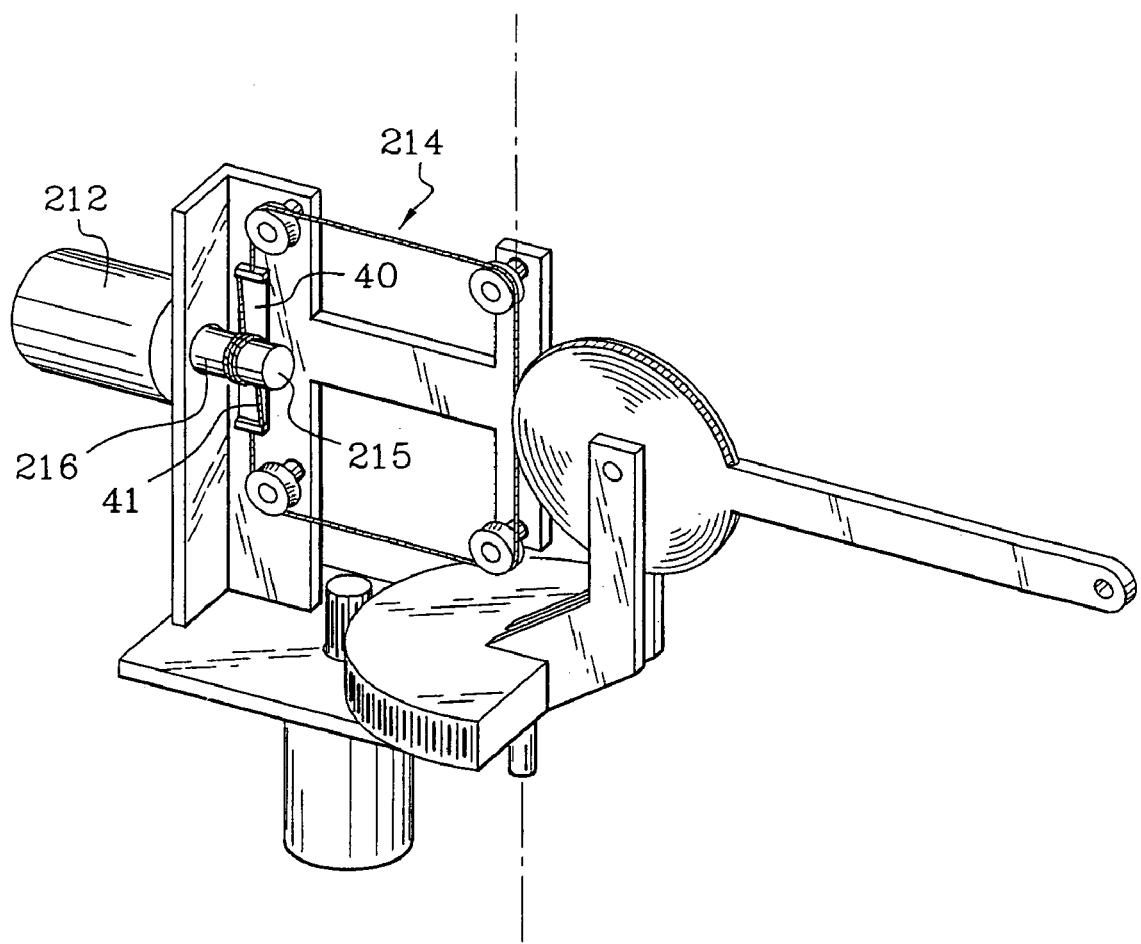

This residual extension of the cable is completely obviated by adopting the layout of FIG. 3, which differs from the previous one in that the cable (here 214) is not wound on a driving pulley but is fixed to a linear transmission such as a rack 40 associated with an additional cable 41 wound around a pulley 215 of the driving shaft 216. In such a system, the rotation of the driving shaft 216 displaces the rack 40 linearly (vertically) and has the cable 214 slide on itself without not in the least changing its shape; the deformations consecutive to the displacement of the stacking of the turns are withstood by the additional cable 41. In this embodiment, even less than in the previous ones, the tension of the cable 214 does not depend on the movements of support 2 or unit 5.

It should be noted that other idle pulleys may be added if the driving motor 12, 112 or 212 should be placed further away from the unit in another position. Also, the additional idle pulleys may be present in an uneven number. In the same way, idle pulleys may be positioned on the body 2 in order to place the Z axis of rotation of the body 5 in another position or orientation.

Up to now, the invention has been described for a master arm with force feed back motors. It may also be applied to robots with displacements controlled by these same motors.

Figure 4:
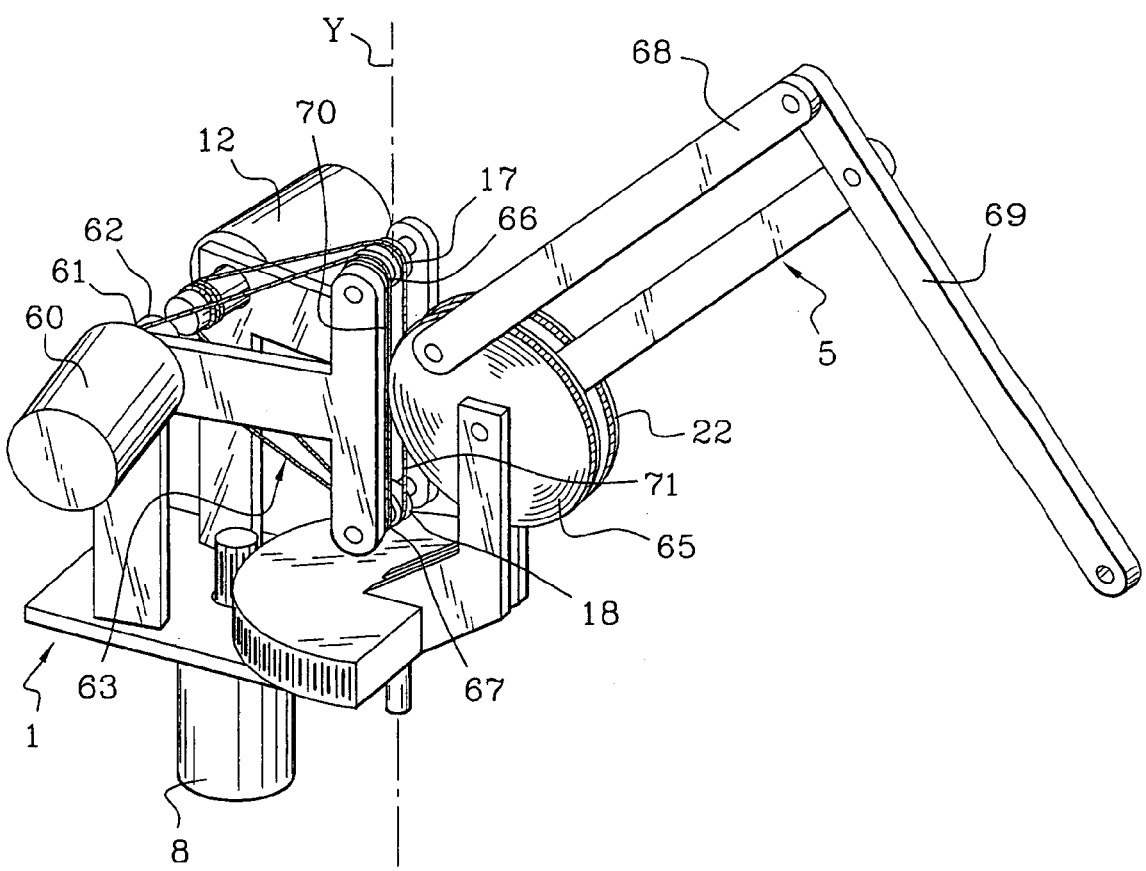
FIG. 4 is a more complex layout wherein the invention is used with benefit.

A robot arm articulation layout including the previous mechanism may be described by means of FIG. 4.

In fact, this is a development of the embodiment of FIG. 1, where in addition to unit 5, to the second motor 12, etc., an analogous mechanism is found which comprises a third motor 60, an output shaft 61 with a driving pulley 62, a pair of idle pulleys 66 and 67 and a driven pulley 65, and parallel to the previous driven pulley 22 by rotating around the second axis Z. A cable 63 is tensioned between the driving pulley 62 and the driven pulley 65 by having it pass through the idle pulleys 66 and 67, which are adjacent to the idle pulleys 17 and 18 of the other mechanism, respectively; the strands 70 and 71 of the cable 63 connecting the idle pulleys 66 and 67 to pulley 65 themselves also substantially coincide with the second axis Y. Cables 14 and 63 are located in planes forming an acute angle between them, in order to slightly move the motors 12 and 60 away from each other while keeping each of them mounted on the base 1.

A connecting rod 68 may be articulated with the driven pulley 65. This parallelogram type mechanism may also be achieved through cables; for this, one or more cable strands are secured on pulleys attached to bodies 65 and 69 and the axes of which respectively pass through the (Z) axis and through the linkage axis of bodies 5 and 69, thereby achieving transmission of the movement of the control pulley 65 to the body 69. It is seen that the displacement of the arms 69 in a vertical plane may be controlled by the joint movements of motors 12 and 60, which cause both driven pulleys 22 and 65 to rotate independently and that the position of the pivoting plane of arm 69 may be changed with motor 8. Both transmission systems controlled by motors 12 and 60 both benefit almost entirely from the advantages of the invention because of the proximity of the strands of cables 14 and 63 which are adjacent to the driven pulleys 22 and 65 and of the Y axis. It will be noted that the end of the arm 69 may take up all the positions in space, whereas the three motors which control this position are all secured to base 1 and form a compact assembly. The thereby formed robot will not be very bulky, the arm 69 being exposed and the motors being grouped together at a fixed (or at least mobile) base portion of the robot; and the unit 5, the connecting rod 68 and the arm 69 will not have to withstand the stresses generated by the motor weight and may be built so as to be more lightweight. For instance, to obtain a robot with six degrees of freedom, a handle may be added to the robot in FIG. 4.

The invention claimed is:

1. An articulated mechanism which may belong to a robot arm, comprising a base (1), a support (2) rotating on the base around a first axis (Y) and a unit rotating on the support (2) around a second axis (Z) not parallel to the first axis, as well as an actuator of the unit for rotating it, the actuator comprising a motor secured to the base; and characterized in that the actuator further comprises a tensioned cable (14) between a shaft of the motor, a pair of idle pulleys rotating on the base and a pulley attached to the unit, the idle pulleys (17, 18) being substantially tangent to the first axis; the idle pulleys (17, 18) and the pulley of the unit (22) being positioned so that the cable forms a pair of strands (23, 24) substantially in extension and collinear with the first axis, between the pulley of the unit and the idle pulleys, respectively.

2. The articulated mechanism according to claim 1, characterized in that the mechanism comprises other idle pulleys (30, 31), the cable being tensioned between the shaft of the motor and the pulley of the unit and forming two branches passing through two complementary groups of idle pulleys.

3. The articulated mechanism according to any of claims 1 or 2, characterized in that the shaft of the motor (116, 216) is perpendicular to two of the idle pulleys.

4. The articulated mechanism according to any of claims 1 to 2, characterized in that the mechanism comprises a transmission (40) with a linear displacement between the shaft of the motor and the cable.

5. An articulated mechanism which may belong to a robot arm, comprising a base (1), a support (2) rotating on a base around a first axis (Y), further comprising two pulleys (22, 65) rotatably mounted on the support (2) for controlling an arm (69) through a linkage mechanism (5, 68) and two actuators for controlling the pulleys, the actuators each comprising: a motor (12, 60) secured to the base; a tensioned cable (14, 63) between a shaft of the motor (16, 61), a pair of idle pulleys (17, 18, 66, 67) rotating on the base and one of the control pulleys (22, 65); the idle pulleys being substantially tangent to the first axis; the idle pulleys and the control pulleys being positioned so that the cables form pairs of strands (23, 24; 70, 71) substantially in extension and collinear with the first axis (Y), each of them extending between one of the control pulleys (22, 65) and one of the idle pulleys (17, 18; 66, 67).

6. The articulated mechanism according to claim 5, characterized in that the cables (14, 63) substantially extend in planes forming an acute angle between them.

7. The articulated mechanism according to any of claims 5 or 6, characterized in that the linkage mechanism comprises a unit (5) stiffly attached to one of the control pulleys (22) and a connecting rod (68) articulated with the other one of the control pulleys (65); the arm (69) being articulated with the connecting rod and the unit; the control pulleys being parallel and rotating around a second axis (Z) not parallel with the first axis (Y).

8. The articulated mechanism according to any of claims 1, 2, 5, 6, characterized in that the first axis (Y) and the second axis (Z) are orthogonal.

* * * * *